United States Patent Office 2,766,054
Patented Oct. 9, 1956

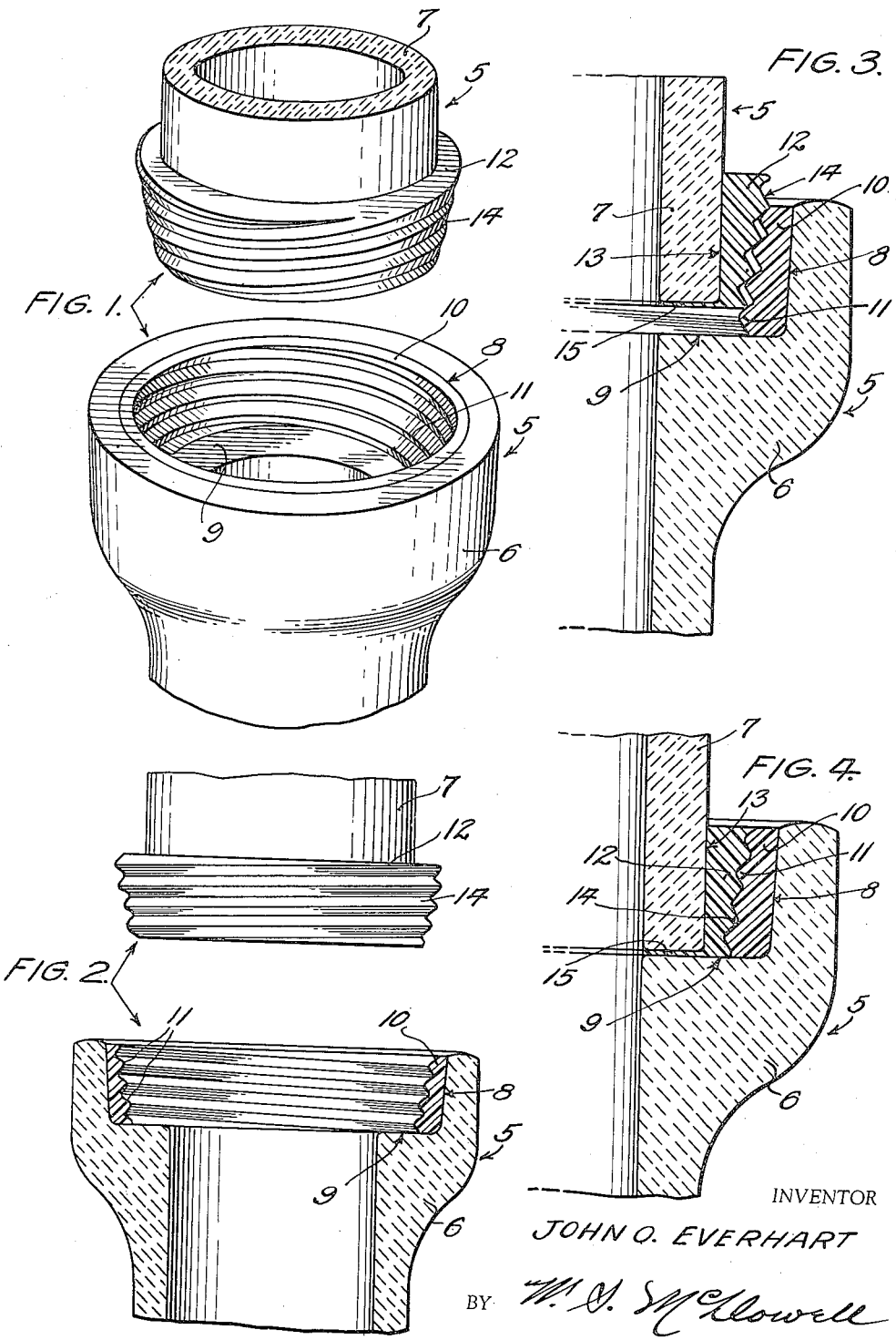

2,766,054

THREADED JOINT-SEALING GASKET RINGS FOR MOLDED PIPE

John O. Everhart, Columbus, Ohio, assignor, by mesne assignments, to The National Clay Pipe Research Corporation, Logan, Ohio, a corporation of Ohio Application September 29, 1952, Serial No. 312,001

5 Claims. (Cl. 285—291)

This invention relates to flexible pipe joints used in underground-laid pipe for connecting pipe sections in longitudinally aligned order and for providing a fluid-tight, root and dirt imprevious seal between adjoining pipe sections.

Prior joint constructions have proposed the use of interfitting pipe-carried rings or collars of yieldable materials which are formed to provide relatively large and extended contact surfaces or areas between the interfitting members of the joint. In their use, considerable frictional resistance is encountered in fully telescoping a ring carried on the end of one pipe section into a socket provided in a complemental ring or gasket carried by a second adjoining pipe section. Ordinarily joints of this type are assembled by forcing the spigot end of one pipe member carrying a yieldable gasket ring on its outer surface into a socket carried on a second pipe member by resort to inwardly applied longitudinally directed thrusting movement. This movement is used to seat the tapering outer surfaces of a first ring in a substantially frusto-conical socket formed in an associated second ring. This operation is often difficult to execute properly and imperfect and unsatisfactory joints frequently are produced.

It is an object of the present invention to provide novel joint-forming rings for securing the contiguous ends of pipe members in longitudinally joined fluid-tight relationship, and wherein the rings are so formed that the pipe ends are united by, first, freely inserting the spigot end of one pipe member into a socket formed in a second ring carried by another adjacent pipe member through easily effected longitudinal movement and, thereafter, finally uniting the joint by rotating one of said pipe members relative to the other.

Another object is to provide a pipe joint for ceramic pipe members wherein the joint comprises resiliently compressible gasket rings disposed between interfitting end regions of the pipe members, and wherein said rings have interfitting conically tapered surfaces on which intermeshing thread-like sections are formed, the arrangement of said sections being such as to permit one ring to be inserted freely into the other complemental ring for a limited distance, the initial engagement of the rings thus effected being then followed by rotation of one of the rings with respect to the other, whereby to unite mechanically the ends of adjoining pipe carrying said ring and to produce a fluid-tight joint which may be quickly assembled, one which is highly resistant to fluid seepage or penetration between surfaces of the joint, and, also, one adapted to prevent separation, when finally united, between the gasket rings and the pipe members on which they are mounted.

For a further understanding of the invention, reference is to be had to the following description and the accompanying drawings, wherein:

Fig. 1 is a perspective view showing in spaced relation the normally interfitting ends of a pair of pipe members, and to which the compressible joint-forming rings of the present invention are applied;

Fig. 2 is another view showing said pipe members in spaced relation, the pipe member on the end of which a bell enlargement is disclosed being shown in vertical cross section, and the pipe member having a spigot end in side elevation;

Fig. 3 is a fragmentary vertical sectional view taken through said pipe members and the gasket rings carried thereby, disclosing the same in the positions which they occupy when the joint is initially formed by inserting the spigot end of a pipe member longitudinally into the bell end of a complementary pipe member;

Fig. 4 is a similar view disclosing the joint in its completed form;

Figure 5:
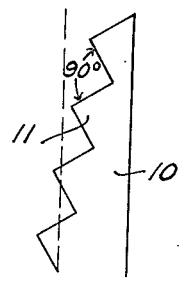
Fig. 5 is a diagrammatic view, disclosing a preferred taper and thread angle for the present screw-threaded joint.

Referring more particularly to the drawings, the numeral 5 designates a pair of molded pipe members, which usually are of ceramic composition. As shown in Figs. 1 through 4 of the drawings, these pipe members are of duplicative construction, each of the same being formed at one end with a bell or relatively enlarged socket-forming member 6 and at its opposite end with a spigot 7. The enlarged bell end of each pipe member provides a receiving socket 8 for the spigot end 7 of a next adjoining pipe member, the socket 8 terminating inwardly in an annular seat or shoulder 9. It will be understood that the invention is adaptable to other standard types of ceramic pipe, etc.

In accordance with the present invention, there is disposed within the socket 8, and in contact with the seat or shoulder 9 thereof, an annular bell-positioned gasket ring or collar 10. The latter may be composed of any one of a considerable number of various adaptable materials. Preferably, the material constituting the body of said ring possesses a desired degree of resiliency or compressibility. In this regard, the ring or collar may be formed from natural vulcanized rubber, or one of the synthetic resin elastomers now employed as a substitute or alternative material for natural rubber. In a preferred composition, the ring 10 is cast or molded from an originally liquid and uncured polyvinyl chloride plastisol, the latter constituting a liquid dispersion of comminuted particles or polyvinyl chloride in a non-volatile plasticiser which is cured to its final resiliently flexible form by elevated temperatures. A plastigel may also be used, since it is basically of the same composition as the plastisol, except that it is thickened by the addition of filler and gelling agents to impart thereto moldable plastic properties.

In practice, the ring 10 may be formed at the manufacturing site by operations involving the casting or molding of the ring in the bell socket 8 of a pipe to form a permanent and component part thereof. A mold, not shown, in carrying out this operation, is inserted in the pipe and into the mold the plastisol is introduced in a fluid state. Thereafter, the plastisol, while contained in the mold, is subjected to a vulcanizing temperature of the order of 350° F. This temperature causes the plastisol to solidify and form a body possessing the required properties of resiliency and flexibility. Also, in the operation described, the ring or collar is permanently joined or bonded to the inner circumferential surfaces of the socket 8 with which the ring or collar contacts. This method of molding the ring in the pipe bell is advantageous, since it may be carried out by the pipe manufacturer, enabling uniformity, dimensional accuracy and quality in the formation and construction of the ring to be quite readily obtained.

The inner wall surfaces of the ring or collar 10 are inwardly tapered toward the shoulder 9, and in the process of molding the said inner surfaces are formed with helical ribs, fins or projections which form, in effect, conical screw threads, as indicated at 11. Thus the yieldable ring 10 provides an internal frusto-conical socket formed with molded screw threads of relatively wide pitch.

The spigot end 7 of the complemental pipe member adapted to occupy the socket 11 has formed thereon, after the manner of forming the ring or collar 10, a compressible collar or gasket ring 12. The latter may be made of the same materials, and produced in the same manner, as the bell ring or collar 10. In this instance, the spigot ring 12 is provided with a central opening 13, the wall surfaces of which are firmly joined or bonded to the cylindrical outer wall surfaces of the spigot 7. At the extreme outer end of the spigot 7, the collar or ring 12 may, if desired, be provided with an integral inturned annular flange 15 which, as shown in Figs. 3 and 4, engages the shoulder 9 of the bell socket and provides a compressible web between the spigot and bell ends of the united pipe members.

As shown, the outer circumferential wall of the ring 12 possesses substantially the same taper or generally frusto-conical formation as the inner wall of the bell ring 10, the same being formed with continuous helical ribs, fins, or projections constituting external screw threads 14, and which are adapted to engage with the internal threads 11 of the ring 10.

It will be manifest that when the pipe members 5 have the ends thereof equipped with the gasket rings 10 and 12 of the present invention, the said pipe members may be relatively joined in a quick, convenient and fluid-tight manner by merely inserting the spigot end 7 of a pipe member 5, when equipped with a collar or ring 12 thereon, into the internally threaded socket of the ring or collar 10 of the next adjoining pipe member. Due to the taper of the conical thread-bearing surfaces of the rings or collars, the said threads will not be engaged until after considerable longitudinal movement of the pipe members has taken place. When the end of this longitudinal movement is reached, which is effected through the contact of the ring or collar 12 with one of the inner threads of the ring or collar 10, rotary movement, amounting to from one-fourth to two turns, is imparted to one of the pipe members so that a tight threaded union of said members is attained. This construction avoids in their securing repeated revolutions of the pipe members, as would occur if the threads were formed on cylindrical surfaces extending parallel with the axis of the pipe members. The relatively coarse pitch and taper of the threads, as shown, permits free and unhindered insertion of the spigot ring so that the same may be moved longitudinally past about four threads on, for example, a six thread bell ring before the spigot ring engages the latter. Not more than two turns of the spigot will then tighten the joint. The grooves and crest of the threads are formed preferably with a slight radius to avoid sharp corners. By way of illustration, the threads are of the order of about four per inch, the ring wall on which the threads are formed being inclined at an angle with respect to the axis of the pipe not substantially less than five degrees.

Figure 9:
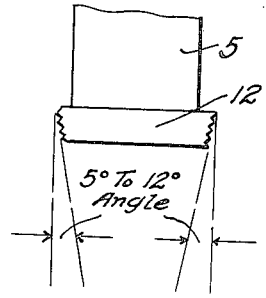
Fig. 9 is a diagrammatic view disclosing the tapering characteristics of the threaded gasket carried on the spigot end of a pipe section.

As shown in Figs. 5 and 9 of the drawings, a taper of the order of 12 degrees is employed. This taper results in about one inch reduction in every four inches of length of the spigot-carried ring parallel to the pipe axis. I have found that five degrees is in all probability a satisfactory minimum taper for the threaded ring faces with respect to the pipe axis, but of course, I do not limit myself to this particular inclination. If twelve degrees are exceeded to any great extent, it will possibly require that the annular space constituting the bell socket be enlarged above present standards, which would be undesirable from a manufacturing standpoint. Also, to incline these faces much more than twelve degrees would serve to reduce ejecting pouring space between mold and pipe members in operations in which the rings are cast in molds, not shown, placed removably in or around the ends of the pipe receiving the rings. When four threads are used per inch on a ring molded one inch high in a pipe cavity, the inclination of the threaded surface of the ring may be about 12 degrees, and with shallow threads of the type set forth, the spigot ring will pass about these threads with relative ease before the threads contact for rotational final engagement.

Figure 6:
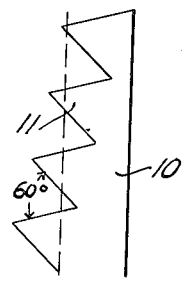
Fig. 6 is a similar view disclosing thread formations of inferior design.

It is another essential feature of this joint, if it is to be assembled by insertion past most of the threads of the bell ring before turning, that the threads be shallow. For instance, the thread faces, as shown in Fig. 5, should be of the order of 90 degrees with respect to each other, rather than 60 degrees, as in standard threads, such as those shown in Fig. 6. When the threads are of the order of 90 degrees, the projection of the end of the bottom thickened thread having the same taper as that indicated in Fig. 5, permits the lower thread of the spigot-carried ring to pass the first two threads of the bell ring cleanly, and may be forced by the third thread quite easily through slight deformation thereof, thus causing the first thread of the spigot ring to engage the fourth thread of the bell ring before rotation is necessary to provide a completely liquid-tight joint.

Figure 7:
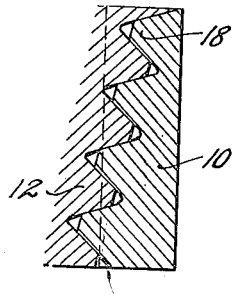
Fig. 7 is a similar view showing a joint having acme-type threads.
Figure 8:
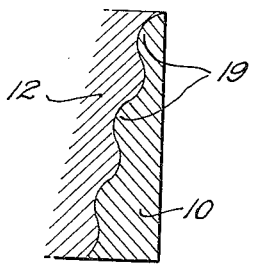
Fig. 8 is a similar view disclosing the employment of threads of rounded form, known as "knuckle" threads.

It is also evident that blunted threads 18 of the acme-type, as shown in Fig. 7, may be used. Also, if desired, rounded threads 19, such as those indicated in Fig. 8, and known as "knuckle" threads may be used in producing the threaded interfaces of the rings.

Figure 10:
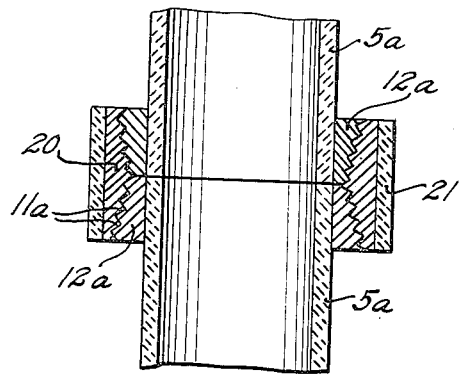
Fig. 10 is a vertical sectional view illustrating a modified form of joint when applied to plain-ended pipe.

As shown in the modification disclosed in Fig. 10, the present screw-threaded joint may also be employed in connection with plain-ended pipe, as well as in connection with bell and spigot types of pipe. In this instance, the ends of a pair of plain-ended pipe sections 5a are provided with tapered screw-threaded gasket rings 12a which are adapted to fit within and engage the cooperatively tapered threads 11a formed on an annular double socket gasket 20 which is cast or molded upon the inner surface of a rigid annular ceramic collar or socket-forming member 21. The gasket 20 is formed to provide opposite screw-threaded and inwardly tapering sockets at each end thereof, whereby the same may be applied to one of the pipe sections 5a prior to installation, and thereby receive the next adjacent pipe section during laying of the pipe.

Through the constructions set forth, the present invention provides an improved yieldable, fluid-tight joint for uniting and sealing the interfitting ends of molded pipe members. The construction is simple, capable of being readily understood by unskilled labor, and lends itself to the practical conditions found in the laying of underground pipe. By having the screw-threaded rings or collars formed from a yieldable or resilient material, such as the vulcanized plastisol set forth, tight joints will be secured even though the pipe members on which the packing rings or collars are mounted may be slightly out of round in transverse cross section, or if the same possess axial angularity in their longitudinal alignment with adjoining pipe members.

In connection with the above description, it will be noted that the material from which the rings are formed is somewhat yieldable or deformable under readily applied pressures. Because of this characteristic even though the threads on the spigot end of a pipe may contact at their apexes those of the threads or ribs on the bell-mounted ring, yet by slight application of longitudinally applied force the contacting portions may be deformed sufficiently to provide for the longitudinal insertion of the spigot end of a pipe into a bell socket and before rotation on the part of the inserted pipe is necessary in producing the final securing together of the pipe members and the closing of the joints.

While I have described in detail certain preferred embodiments of the present invention, nevertheless, it will be understood that the invention is not necessarily restricted to such embodiments, but may be varied or modified within the teachings of the above description and the following claims.

I claim:

1. In a flexible pipe joint; a first pipe section; a male gasket ring of resiliently compressible material carried on an end of said first pipe section and formed with an external, helical, screw-threaded surface, the screw-threaded surface of said male gasket ring being tapered inwardly toward the said end of said first pipe section; a second generally cylindrical pipe section carrying at an end thereof a relatively enlarged socket-forming member; and a female gasket ring of resiliently compressible material carried in said socket-forming member and formed with an internal, helical, screw-threaded surface, the screw-threaded surface of said female gasket ring being tapered inwardly toward the body portion of said second pipe section and defining in said socket-forming member a frusto-conical, screw-threaded socket for the tight threaded reception of said male gasket ring, the angle of taper of the screw-threaded surfaces of both said male and female gasket rings being the same and ranging from five (5) to twelve (12) degrees with respect to the longitudinal axes of said first and second pipe sections, the combined taper and resiliency of the threads of said gasket rings permitting said male gasket ring to be initially inserted a substantial axial distance within the socket defined by said female gasket ring through relative axial movement only of said pipe sections before the threads of said rings are brought into threaded engagement with one another for final tightening by relative rotational movement of said pipe sections to provide a flexible, fluid-tight union therebetween.

2. A flexible pipe joint as defined in claim 1, wherein the threads of said male and female gasket rings are formed with crests terminating short of a point.

3. In a flexible pipe joint; a pipe section having on an end thereof a first annular gasket member of resiliently compressible material formed with a frusto-conical, screw-threaded outer side surface; and a socket member carrying on the interior surface thereof a second annular gasket member of resiliently compressible material defining an internal, inwardly tapering, screw-threaded socket for the tight threaded reception of said first gasket member, the angle of taper of the threads of said first and second gasket members being identical and ranging from five (5) to twelve (12) degrees with respect to the axes of said pipe section and said socket member, whereby to permit said first gasket member to be initially inserted a substantial distance within said second gasket member through relative axial movement only thereof before the threads of said gasket member are brought into tight threaded engagement with one another through relative rotation of said gasket members in securing a fluid-tight yet flexible union between said pipe section and said socket member.

4. In a pipe joint, a spigot pipe section, a ring in substantially non-rotatable relation to and surrounding the end of said spigot pipe section, a second pipe section, said second pipe section having a ring therein surrounded by a portion thereof and disposed in substantially non-rotatable relation thereto, said rings having interlocking helical screw-threads, said rings including said screw-threads being of resiliently yieldable, rubber-like material, the surface of said first ring and its screw-threads being tapered and converging toward the end of the spigot pipe section, the surface of the other ring and its screw-threads being tapered substantially similarly to the first-mentioned surface, and the rings being so proportioned that the first ring is axially movable into the bore of the other ring a substantial distance without relative rotation and with temporary displacement of portions of the screw-threads before the threads are brought into helical engagement with one another for final tightening through relative rotation of the pipe sections.

5. A pipe joint according to claim 4 wherein said rings are bonded to their respective pipe sections.

References Cited in the file of this patent

UNITED STATES PATENTS

| | | |
|---|---|---|
| 515,627 | Sykes | Feb. 27, 1894 |
| 522,750 | Brown | July 10, 1894 |
| 556,215 | Schmidt | Mar. 10, 1896 |
| 2,271,936 | Carson | Feb. 3, 1942 |
| 2,517,778 | Fischer | Aug. 8, 1950 |

FOREIGN PATENTS

| | | |
|---|---|---|
| 658,029 | Great Britain | Oct. 3, 1951 |